US011924884B2

(12) United States Patent
Lei et al.

(10) Patent No.: US 11,924,884 B2
(45) Date of Patent: *Mar. 5, 2024

(54) PREAMBLE AND PHYSICAL UPLINK SHARED CHANNEL RESOURCE ORDERING AND SCRAMBLING IDENTIFIER GENERATION FOR TWO-STEP RANDOM ACCESS CHANNEL PROCEDURE

(71) Applicant: QUALCOMM Incorporated, San Diego, CA (US)

(72) Inventors: Jing Lei, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/822,510

(22) Filed: Aug. 26, 2022

(65) Prior Publication Data

US 2022/0408493 A1 Dec. 22, 2022

Related U.S. Application Data

(63) Continuation of application No. 16/947,493, filed on Aug. 4, 2020, now Pat. No. 11,470,650.

(Continued)

(51) Int. Cl.
*H04W 74/08* (2009.01)
*H04W 72/04* (2023.01)

(52) U.S. Cl.
CPC ....... *H04W 74/0833* (2013.01); *H04W 72/04* (2013.01)

(58) Field of Classification Search
CPC ........... H04W 74/0833; H04W 64/006; H04W 74/08; H04W 72/04; H04W 16/00;
(Continued)

(56) References Cited

U.S. PATENT DOCUMENTS

| 2021/0112600 A1 | 4/2021 | Lei et al. |
| 2021/0360485 A1 | 11/2021 | Tian et al. |
| 2022/0015156 A1 | 1/2022 | Xu |

FOREIGN PATENT DOCUMENTS

| CA | 3072668 A1 | 2/2019 |
| RU | 2638181 C2 | 12/2017 |
| RU | 2693269 C1 | 7/2019 |

OTHER PUBLICATIONS

International Search Report and Written Opinion—PCT/US2020/070373—ISA/EPO—dated Sep. 29, 2020.
(Continued)

*Primary Examiner* — Ian N Moore
*Assistant Examiner* — Brian T Le
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a random access channel (RACH) occasion (RO) configuration that includes information related to ordered preamble resources. The UE may generate a preamble resource index according to various parameters selected based on the RO configuration information that relates to the ordered preamble resources. The UE may generate an uplink RACH message that includes a preamble based at least in part on the preamble resource index and a payload associated with a physical uplink shared channel (PUSCH) resource unit (PRU) mapped to the preamble resource index. After decoding the uplink RACH message, the base station may send a response message including scrambled downlink control information (e.g., based on a scrambling identifier or payload information associated with the uplink RACH message). Numerous other aspects are provided.

30 Claims, 10 Drawing Sheets

Related U.S. Application Data

(60) Provisional application No. 62/913,118, filed on Oct. 9, 2019.

(58) Field of Classification Search
CPC ...... H04W 36/06; H04W 72/12; H04B 7/024; H04L 1/0001; H04L 5/00
See application file for complete search history.

(56) References Cited

OTHER PUBLICATIONS

OPPO: "On Channel Structure for 2-step RACH," 3GPP Draft, 3GPP TSG RAN WG1 #98bis, R1-1910987, 3rd Generation Partnership Project (3GPP), Mobile Competence Centre, 650, Route Des Lucioles, F-06921, Sophia-Antipolis Cedex, France, vol. RAN WG1. No. Chongqing, China, Oct. 14, 2019-Oct. 20, 2019, Oct. 5, 2019 (Oct. 5, 2019), XP051808781, 9 pages, Retrieved from the Internet: URL: https://ftp.3gpp.org/tsg_ran/WG1_RL1/TSGR1_98b/Docs/R1-1910987.zip R1-1910987.doc [retrieved on Oct. 5, 2019] Sections 2.4. 3 and 4; p. 3-p. 8.

Qualcomm Incorporated: "Channel Structure for Two-Step RACH," 3GPP Draft, 3GPP TSG-RAN WG1 Meeting #98, R1-1909239, Channel Structure for Two-Step RACH, 3rd Generation Partnership Project (3GPP), Mobile Competence Centre, 650, Route Des Lucioles, F-06921, Sophia-Antipolis Cedex, France, vol. RAN WG1. No. Prague, Czech Republic, Aug. 26, 2019-Aug. 30, 2019, Aug. 17, 2019 (Aug. 17, 2019), XP051765844, pp. 1-20, Retrieved from the Internet: URL: http://www.3gpp.org/ftp/tsg_ran/WG1_RL1/TSGR1_98/Docs/R1-1909239.zip [retrieved on Aug. 17, 2019] p. 3-p. 9 p. 16-p. 17.

ZTE, et al., "On the Remaining Issues of msgA Channel Structure," 3GPP Draft, 3GPP TSG RAN WG1 #98, R1-1908181, On the Remaining Issues of msgA Channel Structure, 3rd Generation Partnership Project (3GPP), Mobile Competence Centre, 650, Route Des Lucioles, F-06921, Sophia-Antipolis Cedex, France, vol. RAN WG1. No. Prague, CZ, Aug. 26, 2019-Aug. 30, 2019, Aug. 16, 2019 (Aug. 16, 2019), XP051764800, 23 pages, Retrieved from the Internet: URL: http://www.3gpp.org/ftp/tsg_ran/WG1_RL1/TSGR1_98/Docs/R1-1908181.zip—[retrieved on Aug. 16, 2019] Sections 2.5. 3.1; p. 6-p. 15.

Taiwan Search Report—TW109126474—TIPO—dated Dec. 5, 2023.

PREAMBLE AND PHYSICAL UPLINK SHARED CHANNEL RESOURCE ORDERING AND SCRAMBLING IDENTIFIER GENERATION FOR TWO-STEP RANDOM ACCESS CHANNEL PROCEDURE

CROSS-REFERENCE TO RELATED APPLICATIONS

This application is a continuation of U.S. patent application Ser. No. 16/947,493, filed on Aug. 4, 2020, issued as U.S. Pat. No. 11,470,650 dated Oct. 11, 2022 entitled "PREAMBLE AND PHYSICAL UPLINK SHARED CHANNEL RESOURCE ORDERING AND SCRAMBLING IDENTIFIER GENERATION FOR TWO-STEP RANDOM ACCESS CHANNEL PROCEDURE," which claims priority to U.S. Provisional Application No. 62/913,118, filed on Oct. 9, 2019, entitled "PREAMBLE AND PHYSICAL UPLINK SHARED CHANNEL RESOURCE ORDERING AND SCRAMBLING IDENTIFIER GENERATION FOR TWO-STEP RACH PROCEDURE," the contents of which are incorporated herein by reference in their entireties.

FIELD OF THE DISCLOSURE

Aspects of the present disclosure generally relate to wireless communication and to techniques and apparatuses for preamble and physical uplink shared channel (PUSCH) resource ordering and scrambling identifier generation for a two-step random access channel (RACH) procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include: receiving, from a base station, a random access channel (RACH) occasion (RO) configuration that includes information related to ordered preamble resources; generating a preamble resource index according to a plurality of parameters that are selected based at least in part on the information in the RO configuration that relates to the ordered preamble resources; and generating an uplink RACH message that includes a preamble based at least in part on the preamble resource index and a payload associated with a physical uplink shared channel (PUSCH) resource unit (PRU) mapped to the preamble resource index.

In some aspects, a UE for wireless communication may include a memory and one or more processors operatively coupled to the memory. The memory and the one or more processors may be configured: to receive, from a base station, an RO configuration that includes information related to ordered preamble resources; generate a preamble resource index according to a plurality of parameters that are selected based at least in part on the information in the RO configuration that relates to the ordered preamble resources; and generate an uplink RACH message that includes a preamble based at least in part on the preamble resource index and a payload associated with a PRU mapped to the preamble resource index.

In some aspects, a non-transitory computer-readable medium may store one or more instructions for wireless communication. The one or more instructions, when executed by one or more processors of a UE, may cause the one or more processors to: receive, from a base station, an RO configuration that includes information related to ordered preamble resources; generate a preamble resource index according to a plurality of parameters that are selected based at least in part on the information in the RO configuration that relates to the ordered preamble resources; and generate an uplink RACH message that includes a preamble based at least in part on the preamble resource index and a payload associated with a PRU mapped to the preamble resource index.

In some aspects, an apparatus for wireless communication may include means for receiving, from a base station, an RO configuration that includes information related to ordered preamble resources; means for generating a preamble resource index according to a plurality of parameters that are selected based at least in part on the information in the RO configuration that relates to the ordered preamble resources;

and means for generating an uplink RACH message that includes a preamble based at least in part on the preamble resource index and a payload associated with a PRU mapped to the preamble resource index.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
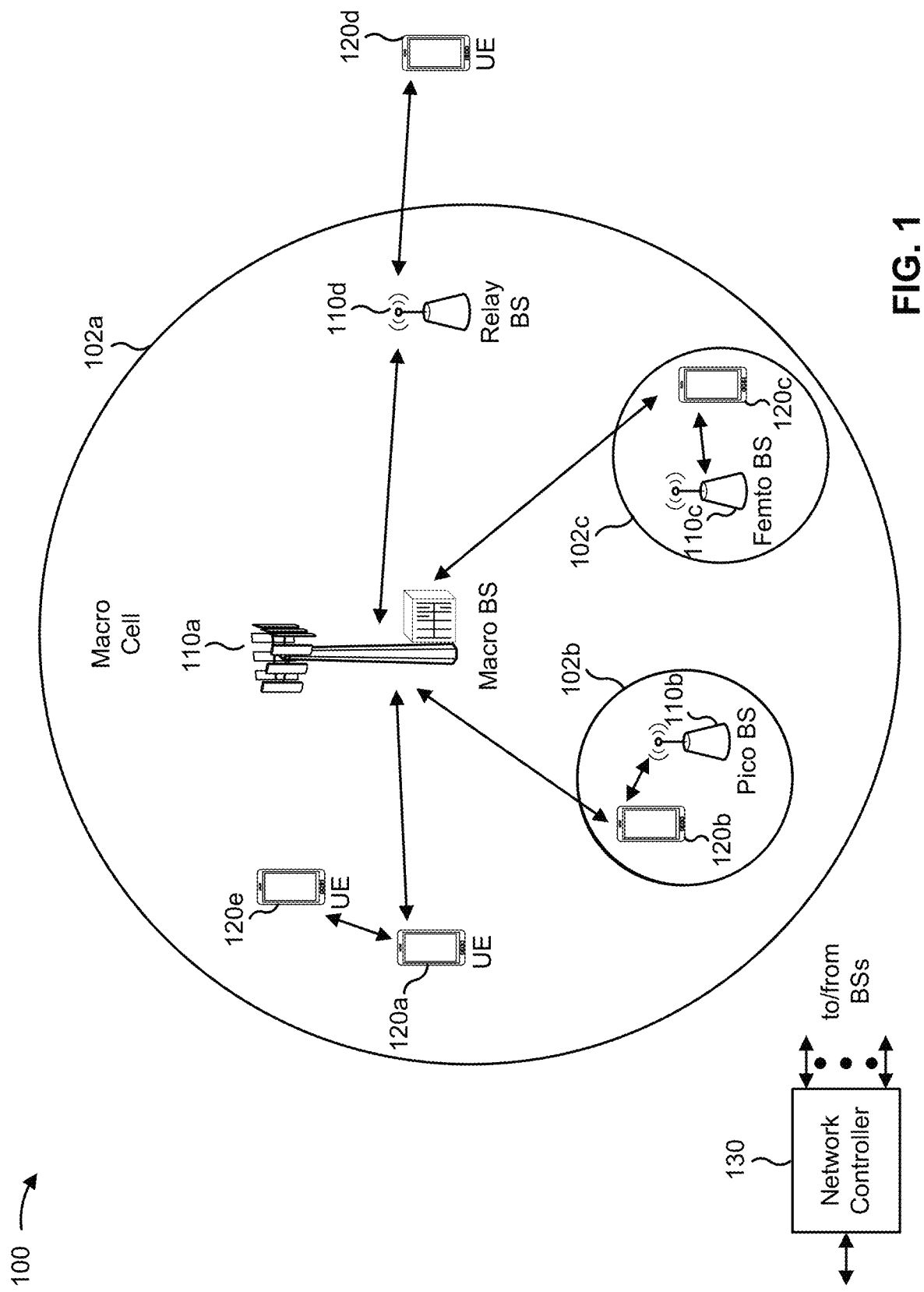
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
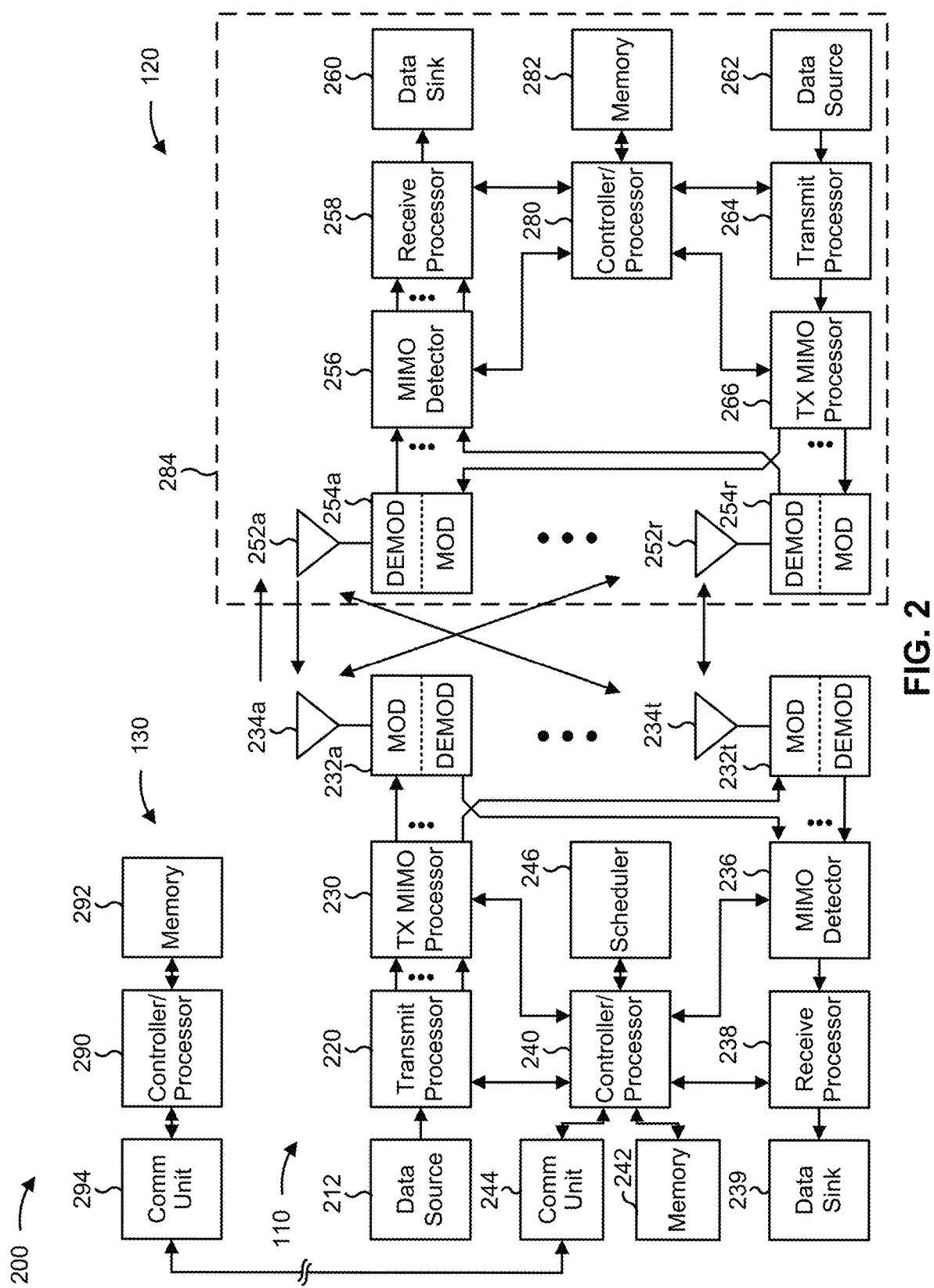
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-8.

Controller/processor 240 of base station 110, controller/processor 280 of UE 120, and/or any other component(s) of FIG. 2 may perform one or more techniques associated with preamble and physical uplink shared channel (PUSCH) resource ordering and scrambling identifier generation for a two-step random access channel (RACH) procedure, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 800 of FIG. 8 and/or other processes as described herein. In some aspects, executing instructions may include running the instructions, converting the instructions, compiling the instructions, interpreting the instructions, and/or the like.

In some aspects, UE 120 may include means for receiving, from base station 110, a RACH occasion (RO) configuration that includes information related to ordered preamble resources, means for generating a preamble resource index according to a plurality of parameters that are selected based at least in part on the information in the RO configuration that relates to the ordered preamble resources, means for generating an uplink RACH message that includes a preamble based at least in part on the preamble resource index and a payload associated with a PUSCH resource unit (PRU) mapped to the preamble resource index, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may access a wireless network by negotiating a connection with a base station included in the wireless network. During connection establishment, the UE and the base station may synchronize the connection in the downlink direction (e.g., from the base station to the UE) and in the uplink direction (e.g., from the UE to the base station). To synchronize the connection in the downlink direction, the UE may read a synchronization signal block (SSB) that includes various synchronization signals transmitted from the base station. The synchronization signals may include a primary synchronization signal (PSS), a secondary synchronization signal (SSS), and/or the like. The UE may use the PSS to determine symbol timing in the downlink direction, and may use the SSS to determine a physical cell identifier, associated with the base station, and frame timing.

To synchronize the connection in the uplink direction, the UE and the base station may perform a RACH procedure. For example, in some cases, the UE and the base station may perform a four-step RACH procedure in which the UE and the base station may exchange four primary RACH communications. The UE may transmit, to the base station, a msg1 communication that may include a RACH preamble communication. The base station may respond to the msg1 communication with a msg2 communication, which may include a random access response (RAR) communication. The UE may respond to the msg2 communication with a msg3 communication, which may include a radio resource control (RRC) connection request communication. The base station may respond to the msg3 communication with a msg4 communication, which may include a medium access control (MAC) layer control element (MAC-CE) contention resolution identifier communication.

In some cases, the four-step RACH procedure may not meet low-latency requirements of 5G/NR wireless systems. Accordingly, the UE and the base station may use a two-step RACH procedure to reduce latency in synchronizing the connection in the uplink direction. In a two-step RACH procedure, the UE may combine the msg1 communication and the msg3 communication into a communication referred to as a msgA communication. The msg1 portion of the msgA communication may be referred to as the preamble portion of the msgA communication, and the msg3 portion of the msgA communication may be referred to as the payload portion of the msgA communication. The UE may transmit the msg1 portion and the msg3 portion sequentially (e.g., according to a time division multiplexing (TDM) configuration) and prior to receiving the msg2 communication and the msg4 communication. The base station may receive the msgA communication and may transmit a msgB communication, which may include the msg2 communication and the msg4 communication.

In some cases, as described above, the msgA communication may include a msgA preamble and a msgA payload. In some cases, the msgA payload may be transmitted using a physical uplink shared channel (PUSCH) resource unit (PRU) mapped to a preamble. For example, a preamble-to-PRU mapping may be one-to-one, many-to-one, or one-to-many. Accordingly, in some cases, there may be scheduling inefficiencies (e.g., signaling overhead) associated with configuring PUSCH resources used to transmit the msgA payload. Furthermore, in some cases, there may be an unacceptably high probability of collisions in wireless systems where the two-step RACH procedure is used in connection with non-orthogonal multiple access (NOMA) and/or contention-based random access (CBRA) techniques.

Accordingly, some aspects described herein provide techniques and apparatuses for ordering preamble and PUSCH resources and generating one or more scrambling identifiers for a two-step RACH procedure. For example, a deterministic or semi-persistent ordering procedure may be used for preamble and/or PUSCH resources to simplify PUSCH resource configuration by system information (SI), RRC signaling, and/or the like, which may reduce signaling overhead, reduce decoding complexity at the base station, and/or the like. Furthermore, some aspects described herein provide techniques and apparatuses for generating a scrambling identifier for a PUSCH transmission (e.g., a msgA payload) and a demodulation reference signal (DMRS), which mitigates inter-cell and/or intra-cell interference, reduces collision probabilities in wireless systems that used NOMA and/or CBRA techniques, and/or the like.

Figure 3:
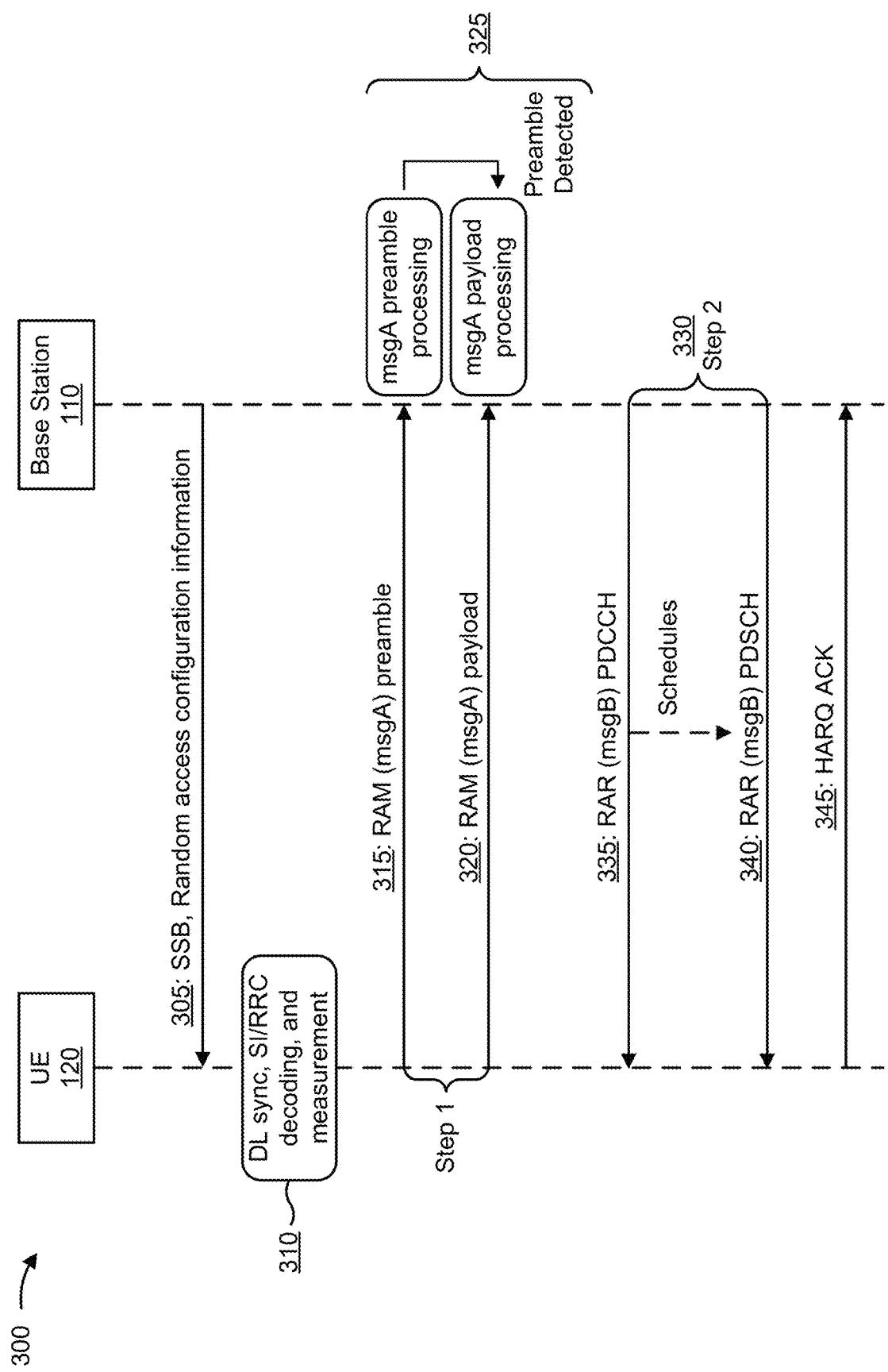
FIG. 3 is a diagram illustrating an example two-step random access channel (RACH) procedure, in accordance with various aspects of the present disclosure.

FIG. 3 is a diagram illustrating an example two-step RACH procedure 300, in accordance with various aspects of the present disclosure. As shown in FIG. 3, a base station 110 and a UE 120 may communicate with one another to perform the two-step RACH procedure.

As shown by reference number 305, the base station 110 may transmit, and the UE 120 may receive, one or more synchronization signal blocks (SSBs) and random access configuration information. In some aspects, the random access configuration information may be transmitted and/or indicated in system information (e.g., one or more system information blocks (SIBs) and/or the like) and/or an SSB, such as for contention-based random access. Additionally, or alternatively, the random access configuration information may include one or more reference signals and/or information transmitted and/or indicated in one or more radio resource control (RRC) signaling messages and/or a physical downlink control channel (PDCCH) order message that triggers a RACH procedure, such as for contention-free random access. Furthermore, as described in further detail elsewhere herein, the random access configuration information may include information related to one or more RACH occasion (RO) configurations, such as information related to one or more ordered preamble resources.

As further shown by reference number 310, the UE 120 may perform downlink (DL) synchronization (e.g., using one or more SSBs), decode system information (SI) and/or RRC configuration information included in one or more SIBs, perform one or more measurements of one or more reference signals, and/or the like. Based at least in part on performing the downlink synchronization, the decoding of the SI and/or RRC configuration information, and/or the measurement of the reference signal(s), the UE 120 may determine one or more parameters for transmitting a random access message (RAM) in the two-step RACH procedure. For example, the UE 120 may determine one or more physical random access channel (PRACH) transmission parameters to be used to transmit the RAM, may determine one or more parameters for generating a preamble of the RAM, may identify one or more uplink resources on which the RAM is to be transmitted, and/or the like.

As shown by reference number 315, the UE 120 may transmit, and the base station 110 may receive, a RAM preamble. As shown by reference number 320, the UE 120 may transmit, and the base station 110 may receive, a RAM payload. As shown, the UE 120 may transmit the RAM preamble and the RAM payload to the base station 110 as part of an initial (or first) step of the two-step RACH procedure. In some aspects, the RAM may be referred to as message A, msgA, a first message, an initial message, and/or the like in a two-step RACH procedure, and/or the like. Furthermore, in some aspects, the RAM preamble may be referred to as a message A preamble, a msgA preamble, a preamble, a physical random access channel (PRACH) preamble, and/or the like, and the RAM payload may be referred to as a message A payload, a msgA payload, a payload, and/or the like. In some aspects, the RAM may include some or all of the contents of message 1 (msg1) and message 3 (msg3) of a four-step RACH procedure. For example, the RAM preamble may include some or all contents of message 1 (e.g., a PRACH preamble), and the RAM payload may include some or all contents of message 3. For example, in some aspects, the RAM payload may include an identifier associated with the UE 120, uplink control information, a medium access control (MAC) layer control element (e.g., a power headroom report, a buffer status report, a beam failure report, a channel state report, and/or the like), user plane data, control plane data, and/or the like. Furthermore, in some aspects, the msgA preamble and the msgA payload may be time division multiplexed (TDMed) with one another, whereby the msgA preamble and the msgA payload may be transmitted in separate symbols based at least in part on a time division multiplexing (TDM) configuration.

As shown by reference number 325, the base station 110 may receive the RAM preamble transmitted by the UE 120. If the base station 110 successfully receives and decodes the RAM preamble, the base station 110 may then receive and decode the RAM payload.

As shown by reference number 330, the base station 110 may transmit a random access response (RAR) (sometimes referred to as a RAR message). As shown, the base station 110 may transmit the RAR message as part of a second step of the two-step RACH procedure. In some aspects, the RAR message may be referred to as message B, msgB, or a second message in a two-step RACH procedure. The RAR message may include some or all of the contents of message 2 (msg2) and message 4 (msg4) of a four-step RACH procedure. For example, the RAR message may include the detected PRACH preamble identifier, the detected UE identifier, a timing advance value, contention resolution information, and/or the like.

As shown by reference number 335, as part of the second step of the two-step RACH procedure, the base station 110 may transmit a physical downlink control channel (PDCCH) for the RAR (e.g., to include some or all of the contents of msg2 of the four-step RACH procedure). The PDCCH communication may schedule a physical downlink shared channel (PDSCH) that includes the RAR (e.g., to include some or all of the contents of msg4 of the four-step RACH procedure). For example, the PDCCH communication may indicate a resource allocation (e.g., in downlink control information (DCI)) for the PDSCH communication.

As shown by reference number 340, as part of the second step of the two-step RACH procedure, the base station 110 may transmit he PDSCH communication for the RAR, as scheduled by the PDCCH communication. The RAR may be included in a medium access control (MAC) protocol data unit (PDU) of the PDSCH communication. As shown by reference number 345, the UE may transmit hybrid automatic repeat request (HARQ) feedback to the base station 110 via a physical uplink control channel (PUCCH) based on whether the UE 120 successfully receives and decodes the RAR message. For example, the HARQ feedback may include an acknowledgement (ACK) in cases where the RAR message is successfully received and decoded by the UE 120, or a negative acknowledgement (NACK) in cases where the UE 120 fails to successfully receive and/or decode the RAR message.

As indicated above, FIG. 3 is provided as an example. Other examples may differ from what is described with regard to FIG. 3.

Figure 4:
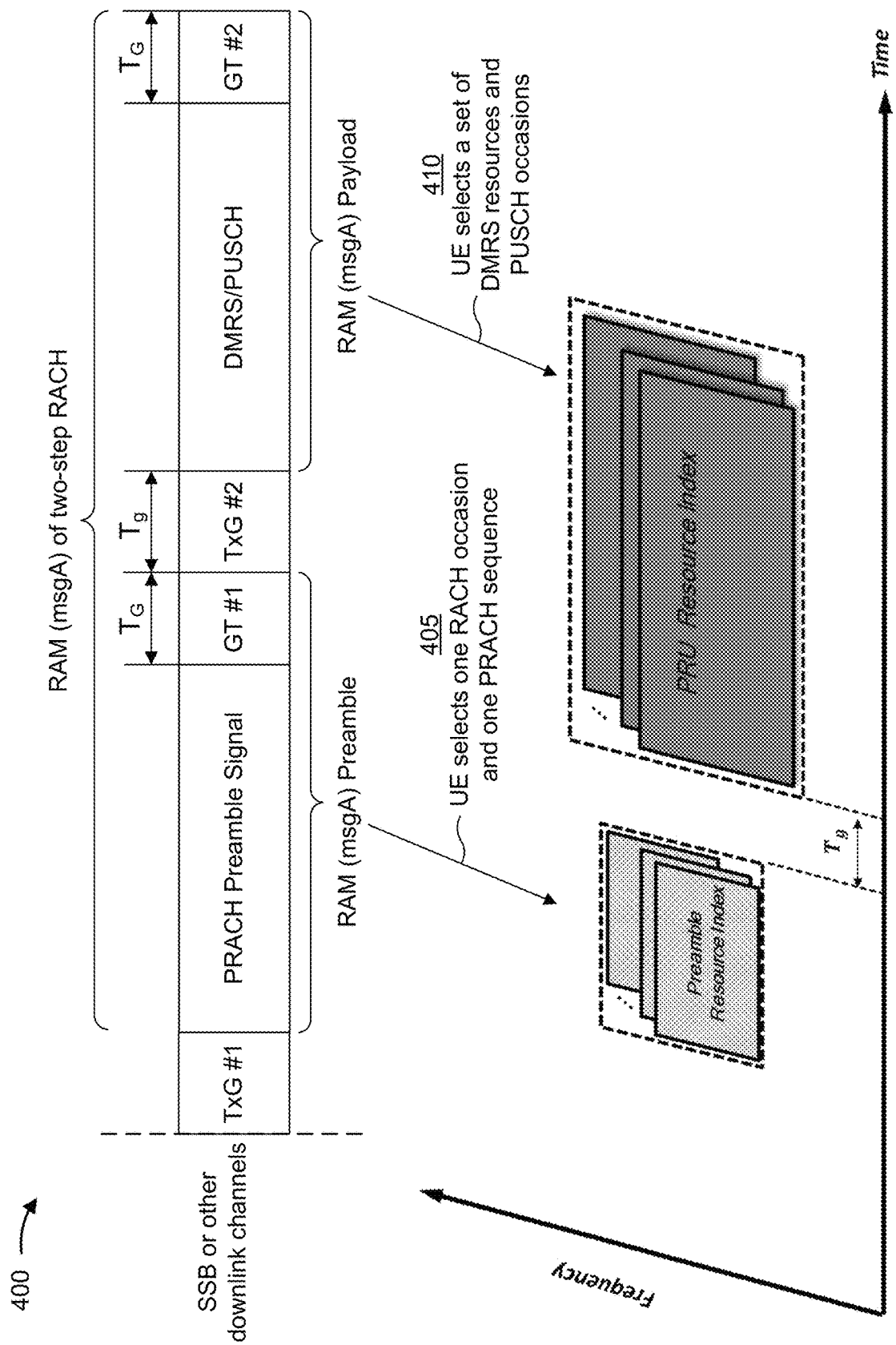
FIG. 4 is a diagram illustrating an example random access message that includes a preamble and a payload, in accordance with various aspects of the present disclosure.

FIG. 4 is a diagram illustrating an example random access message 400 that includes a preamble and a payload, in accordance with various aspects of the present disclosure. As shown, the random access message 400 of the two-step RACH procedure may include a preamble and a payload, as described above. The preamble may include a PRACH preamble signal and a first guard time (shown as GT #1, with a duration of $T_G$). The payload may include a demodulation reference signal (DMRS) and/or a physical uplink shared channel (PUSCH) communication, as well as a second guard time (shown as GT #2, with a duration of $T_G$). As further shown in FIG. 4, transmission of the preamble and transmission of the payload may be separated in time by a transmission guard time (shown as TxG, with a duration of $T_g$).

As further shown in FIG. 4, and by reference number 405, the UE may select one RO and one PRACH sequence to be used to transmit the msgA preamble. For example, as described in further detail elsewhere herein, the UE may select the RO and the PRACH sequence based at least in part on one or more shared ROs that are configured by a base station for the two-step RACH procedure and the four-step RACH procedure, one or more dedicated ROs that are configured by the base station for the two-step RACH procedure, and/or the like. Furthermore, in some aspects, the base station may configure an ordered set of preamble resources on the shared and/or dedicated ROs, and the UE may select the PRACH sequence based at least in part on the ordered set of preamble resources. As further shown in FIG. 4, and by reference number 410, the UE may select a set of DMRS resources and PUSCH occasions to be used to transmit the msgA payload. For example, as described in further detail herein, the UE may select the set of DMRS resources/or and PUSCH occasions based at least in part on a preamble-to-PUSCH resource unit (PRU) mapping. Furthermore, in some aspects, the UE may select multiple PRUs to support frequency hopping, repetition of a PUSCH portion of a msgA payload, and/or the like.

As indicated above, FIG. 4 is provided as an example. Other examples may differ from what is described with regard to FIG. 4.

Figure 5:
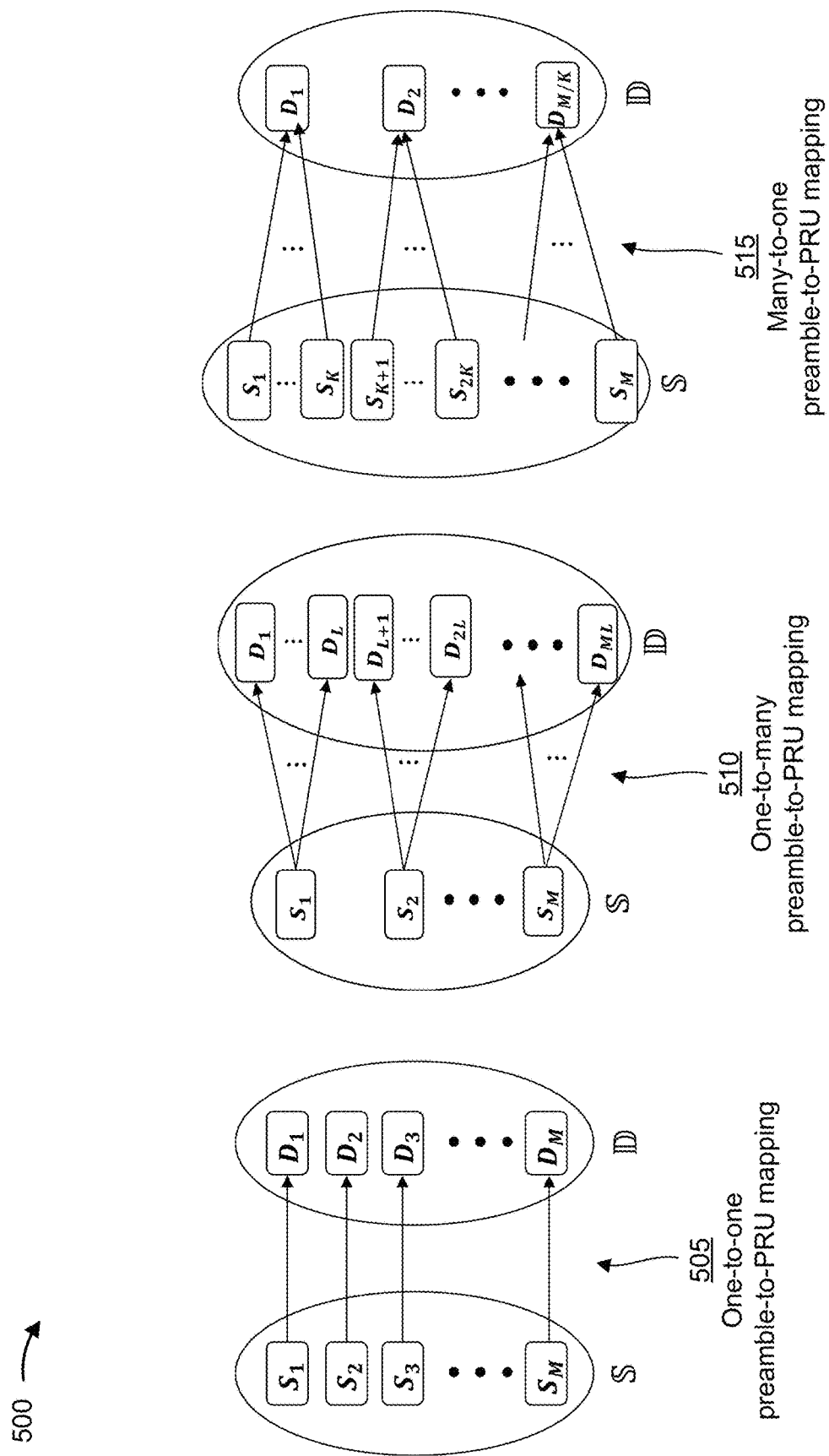
FIG. 5 is a block diagram illustrating example mappings between a preamble and a physical uplink shared channel (PUSCH) resource unit (PRU), in accordance with various aspects of the present disclosure.

FIG. 5 is a block diagram illustrating example mappings 500 between a preamble and a PRU, in accordance with various aspects of the present disclosure. In some aspects, the example mappings 500 shown in FIG. 5 may be used in a two-step RACH procedure in which an initial uplink message (msgA) includes a preamble and a payload, and the payload may be transmitted using a PRU that is mapped to the preamble. For example, as described above, the preamble and the payload are transmitted separately according to a TDM configuration. Accordingly, the example mappings 500 shown in FIG. 5 may be used to define a relationship between a preamble and a payload associated with a msgA (e.g., the UE may select a preamble to transmit in msgA, and may further select a PRU to use to transmit the payload based on the selected preamble).

For example, as shown in FIG. 5, and by reference number 505, the preamble and the PRU may have a one-to-one mapping, in which case the PRU to be used is deterministic. In some aspects, the one-to-one mapping may be used for typical RACH use cases (e.g., to synchronize a connection between the UE and the base station in a downlink direction during connection establishment). In another example, as shown by reference number 510, the preamble and the PRU may have a one-to-many mapping, where the UE may select a PRU from multiple PRUs that are mapped to an individual preamble. In some aspects, the one-to-many mapping may be applied in RACH use cases such as PUSCH hopping, transmitting uplink control information (e.g., HARQ feedback, scheduling requests, channel state information, and/or the like), PUSCH payload repetition, and/or the like. In another example, as shown by reference number 515, the preamble and the PRU may have a many-to-one mapping, where the UE may deterministically select a particular PRU that is mapped to multiple preambles based on the UE selecting one of the multiple preambles that are mapped to the particular PRU. In some aspects, the many-to-one mapping may be applied in RACH use cases such as using the preamble to indicate a modulation coding scheme (MCS), performing asynchronous PUSCH transmission, and/or the like.

As indicated above, FIG. 5 is provided as an example. Other examples may differ from what is described with regard to FIG. 5.

Figure 6:
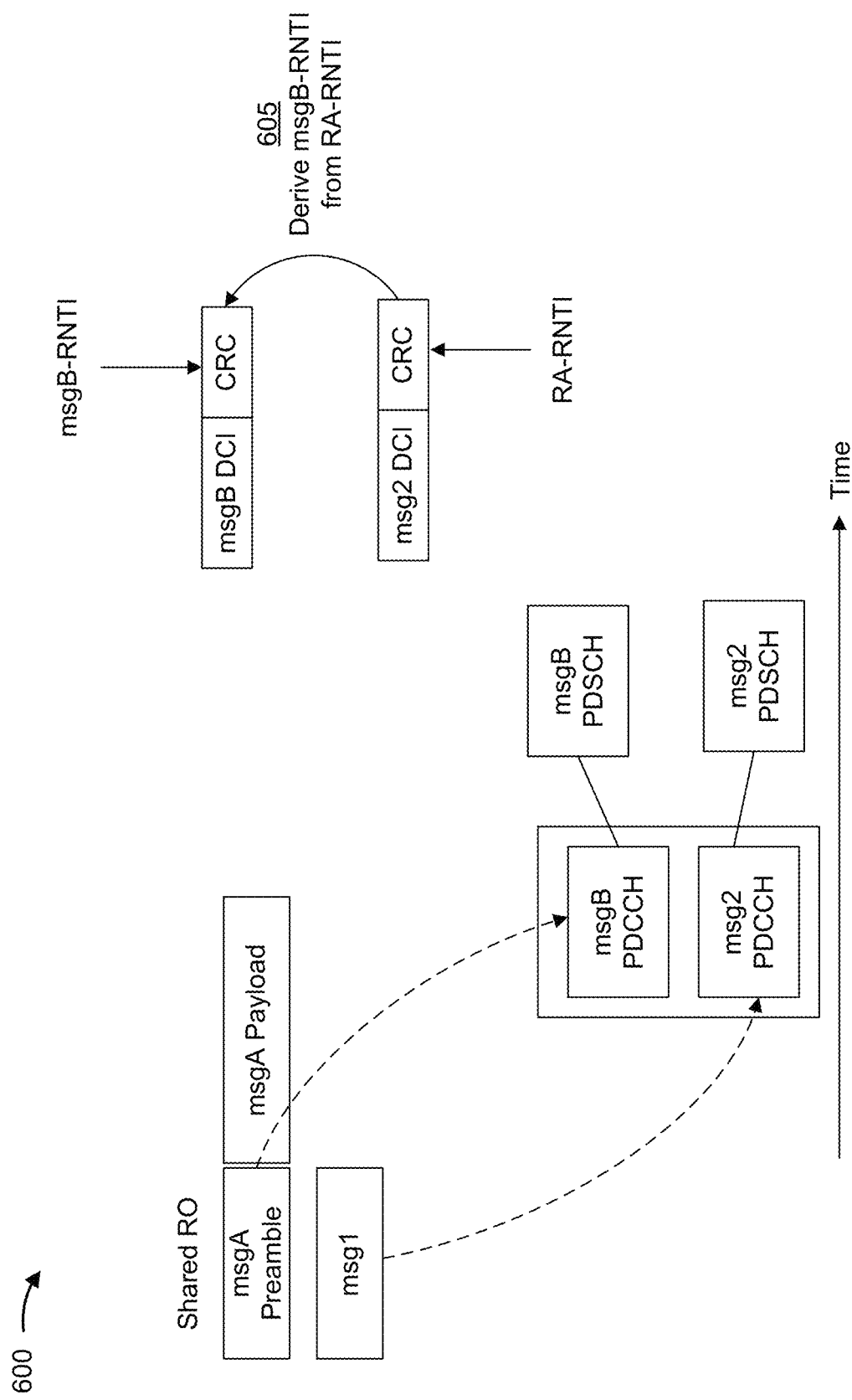
FIG. 6 is a block diagram illustrating an example RACH occasion (RO) shared between a two-step RACH procedure and a four-step RACH procedure, in accordance with various aspects of the present disclosure.

FIG. 6 is a block diagram illustrating an example 600 of a RACH occasion (RO) shared between a two-step RACH procedure and a four-step RACH procedure, in accordance with various aspects of the present disclosure. For example, in some aspects, a wireless network may support both the two-step RACH procedure and the four-step RACH procedure, and one or more ROs may be shared among the two-step RACH procedure and the four-step RACH procedure (e.g., for scheduling efficiency). In general, as described above, one common operation that is shared among the two-step RACH procedure and the four-step RACH procedure includes preamble transmission. Accordingly, in both the two-step RACH procedure and the four-step RACH procedure, the UE may select a preamble sequence from a particular RO, which can be defined according to time and frequency resources. For example, a particular RO may generally include up to 64 preamble sequences, which may be allocated among the two-step RACH procedure and the four-step RACH procedure in the case of a shared RO (e.g., 32 preamble sequences for the two-step RACH procedure and 32 preamble sequences for the four-step RACH procedure).

As a result, in some cases, a first UE performing the two-step RACH procedure may select a msgA preamble from an RO that is shared between the two-step RACH procedure and the four-step RACH procedure, and a second UE performing the four-step RACH procedure may select a msg1 preamble from the same RO. However, as described above, the msgA preamble is generally followed by a msgA payload transmission, whereas the msg1 preamble includes a preamble transmission only. Accordingly, when a base station sends a response message (e.g., a msgB) to the first UE performing the two-step RACH procedure and a second message (e.g., msg2) to the second UE performing the four-step RACH procedure, one or more techniques may be used to differentiate the first UE from the second UE.

For example, as shown in FIG. 6, a msg2 communication in the four-step RACH procedure may include downlink control information (DCI) transmitted via a PDCCH, a PDSCH, and/or the like, and the msg2 DCI may be associated with a cyclic redundancy code (CRC) masked by a random access radio network temporary identifier (RA-RNTI), which may be determined as follows:

$$RA\text{-}RNTI = 1 + s\_id + 14 \times t\_id + 14 \times 80 \times f\_id + 14 \times 80 \times 8 \times ul\_carrier\_id$$

where $s\_id$ is an index of a first OFDM symbol of a specified PRACH (e.g., $0 \le s\_id \le 14$), $t\_id$ is an index of a first slot of the specified PRACH in a system frame (e.g., $0 \le t\_id < 80$), fid is an index of a specified PRACH in a frequency domain (e.g., $0 \le f\_id < 8$), and ul carrier id is an uplink carrier used for PRACH preamble transmission (e.g., zero (0) for a normal uplink (NUL) carrier and one (1) for a supplemental uplink (SUL) carrier). As a result, a range of the RA-RNTI may be from 1 to 17920 ([1, 17920]).

In some aspects, as shown by reference number 605, an RNTI used to mask DCI associated with a msgB communication (msgB-RNTI) may be derived from an RA-RNTI associated with a msg2 communication, to avoid ambiguity between the RA-RNTI and the msgB-RNTI. For example, for a UE in an RRC idle or inactive state, a msgB PDCCH may be addressed to the msgB-RNTI, which may be a UE-specific identifier individually targeting the UE or a group identifier targeting a group of UEs sharing a particular RO. In general, the msgB-RNTI may be defined by a sum of an RA-RNTI and a non-zero offset, as follows:

$$msgB\text{-}RNTI = RA\text{-}RNTI + 14 \times 80 \times 8 \times 2 \times (\text{mod}(rf\_id, 2) + 1)$$

where $rf\_id$ is a radio frame index associated with the msgB PDCCH transmission. In this way, the RA-RNTI does not overlap with the msgB-RNTI, which avoids ambiguity in PDCCH decoding when a particular RO is shared between the two-step RACH procedure and the four-step RACH procedure.

As indicated above, FIG. 6 is provided as an example. Other examples may differ from what is described with regard to FIG. 6.

Figure 7A:
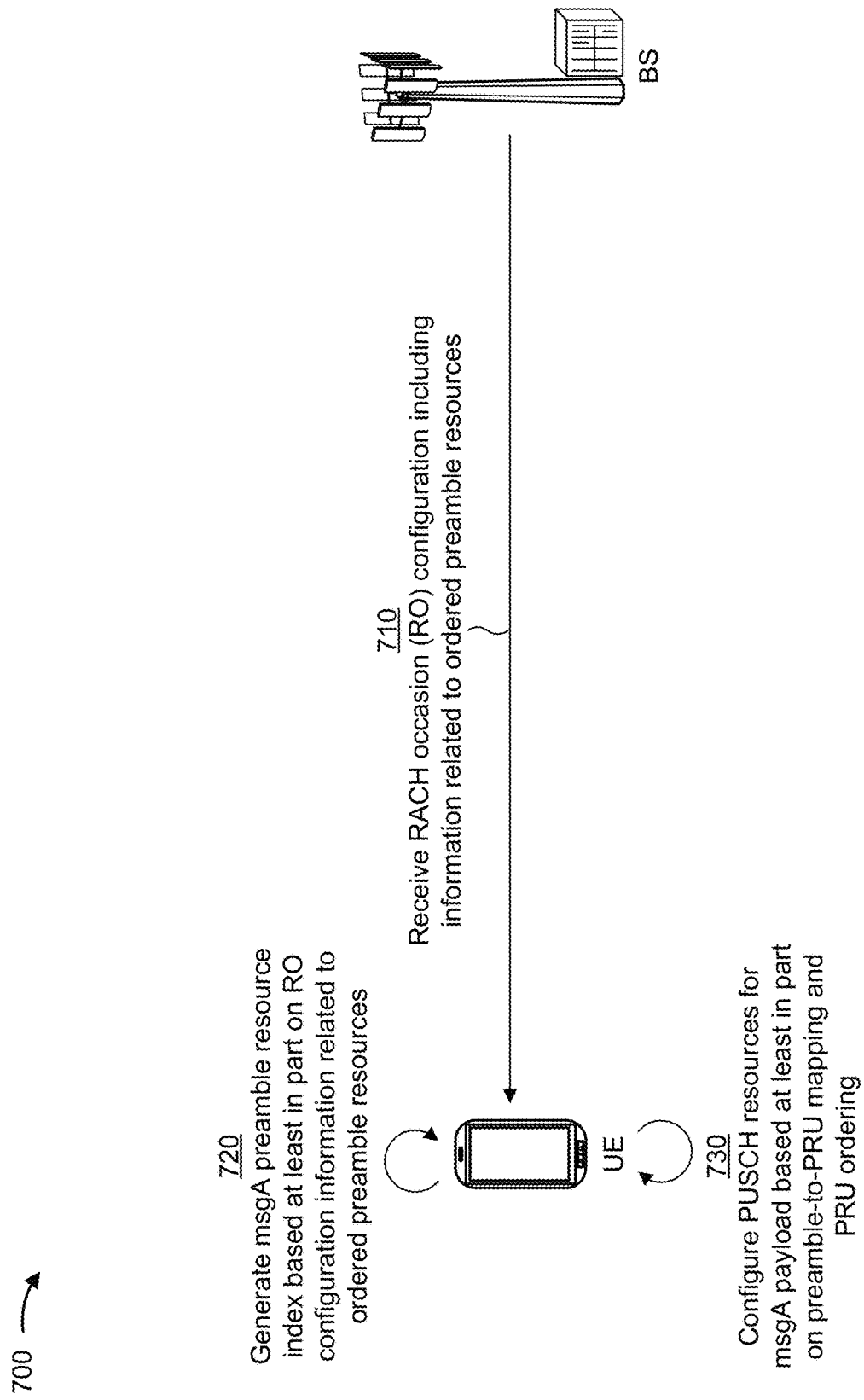
FIGS. 7A-7C are diagrams illustrating an example implementation of ordering preamble and PUSCH resources and generating one or more scrambling identifiers for a two-step RACH procedure, in accordance with various aspects of the present disclosure.
Figure 7B:
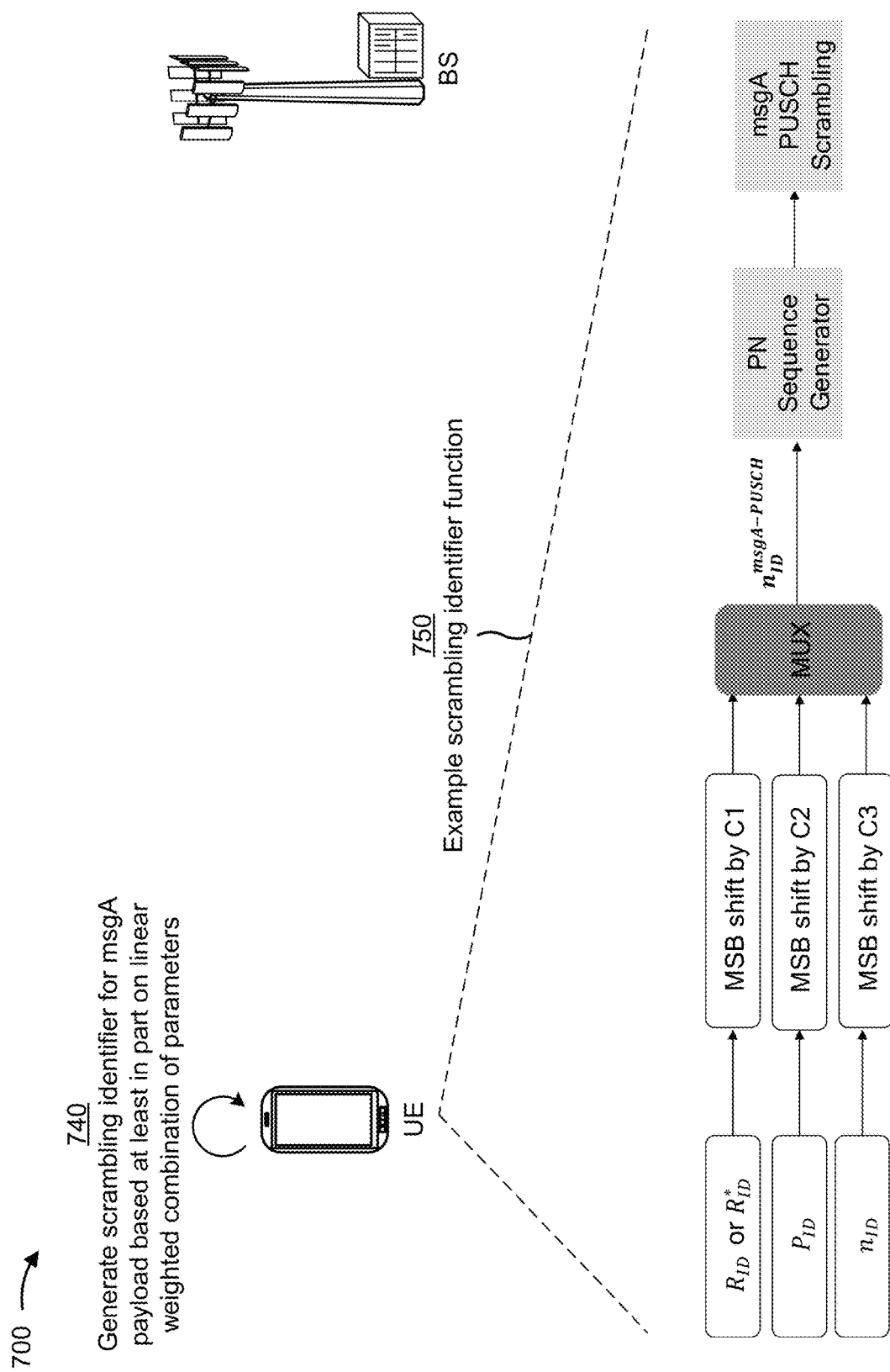
Figure 7C:
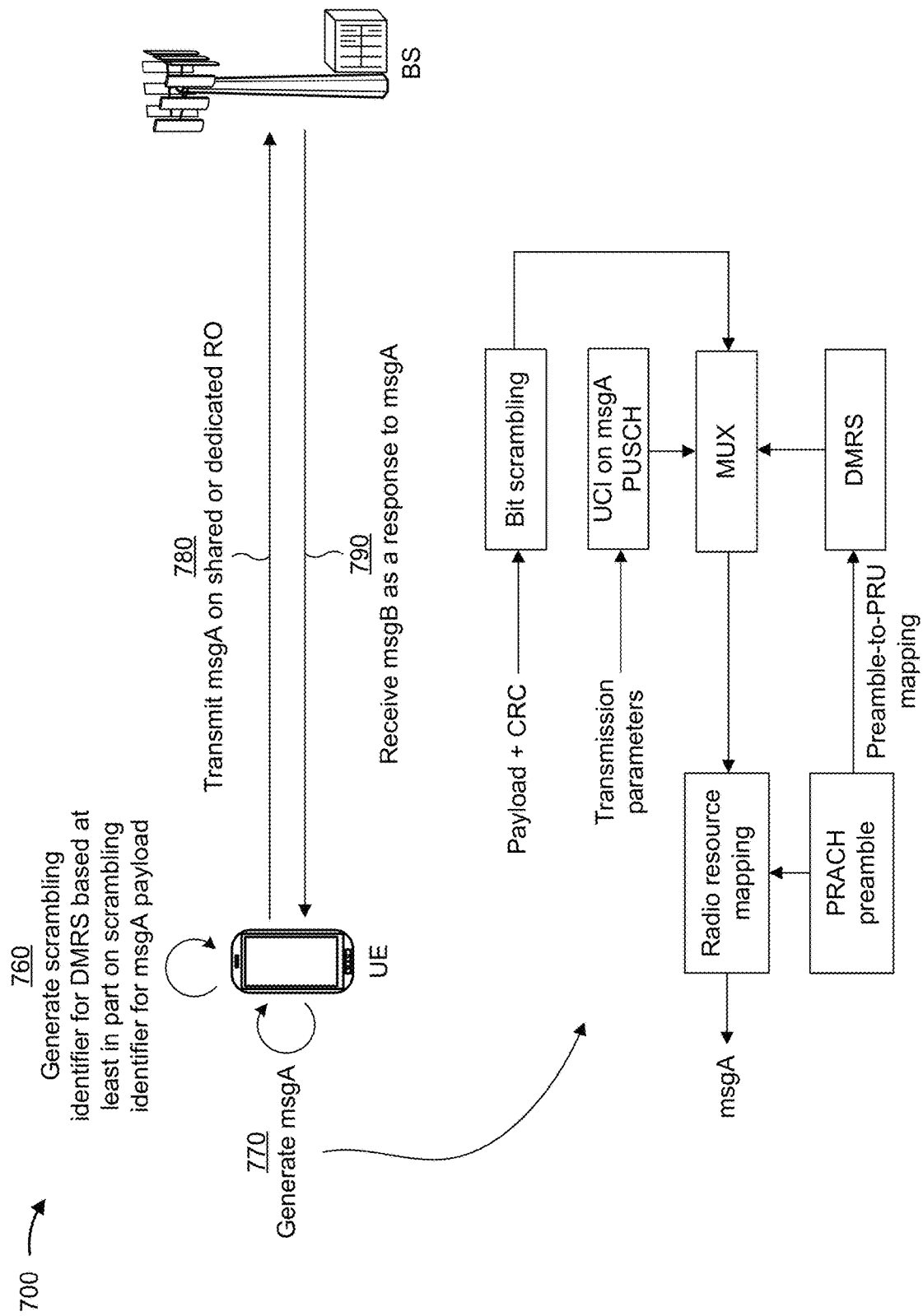

FIGS. 7A-7C are diagrams illustrating an example implementation 700 of ordering preamble and PUSCH resources and generating one or more scrambling identifiers for a two-step RACH procedure, in accordance with various aspects of the present disclosure. As shown in FIGS. 7A-7C, a UE and a base station may perform various operations that relate to ordering preamble and PUSCH resources and generating one or more scrambling identifiers for the two-step RACH procedure.

As shown in FIG. 7A, and by reference number 710, the base station may transmit, and the UE may receive, an RO configuration including information related to ordered preamble resources for the two-step RACH procedure (e.g., via RRC signaling, system information signaling, or other suitable higher-layer signaling). In some aspects, the RO configuration may relate to one or more ROs shared between the two-step RACH procedure and the four-step RACH procedure and/or one or more ROs dedicated to the two-step RACH procedure. Furthermore, in some aspects, the RO configuration may order the preamble resources on the shared ROs and the dedicated ROs jointly (e.g., the same ordering procedures apply to the shared ROs and the dedicated ROs), or the RO configuration may order the preamble resources on the shared ROs and the dedicated ROs separately (e.g., different ordering procedures may apply to the shared ROs and the dedicated ROs).

In some aspects, in cases where the RO configuration relates to one or more ROs that are shared between the two-step RACH procedure and the four-step RACH procedure, preamble sequences may be partitioned or otherwise allocated to the two-step RACH procedure and the four-step RACH procedure to ensure that UEs performing the two-step RACH procedure and UEs performing the four-step RACH procedure use different preamble sequences. Furthermore, in some aspects, indexes of the ordered preamble resources may be repeated in different SSB-RO association periods. For example, in NR, SSBs are generally transmitted using beamforming techniques, whereby the beamformed SSBs may have a periodicity. Furthermore, there may be an association between SSBs and ROs, which may also be periodic. Accordingly, because there are generally a finite quantity of preamble resource indexes, the preamble resource indexes may be recycled or otherwise repeated in different SSB-RO association periods.

As further shown in FIG. 7A, and by reference number 720, the UE may generate a msgA preamble resource index based at least in part on the RO configuration information related to the ordered preamble resources. For example, in some aspects, the RO configuration information may indicate that msgA preamble resources are to be sequentially ordered in different domains by various parameters, which may include one or more parameters in a code domain, one or more parameters in a frequency domain, one or more parameters in a time domain, and/or the like. For example, in some aspects, a first parameter (X) may be used to order the msgA preamble resources in the code domain according to an increasing order of preamble sequence indexes within a particular RO, where 0≤X≤max_preamble_sequences−1, where max_preamble_sequences is a quantity of configured preamble sequences (e.g., 64). Furthermore, a second parameter (Y) may be used to order the msgA preamble resources in the frequency domain according to an increasing order of frequency resource indexes for ROs that are frequency division multiplexed, where 0≤Y≤max_number_FDM_RO−1, where max_number_FDM_RO is configured by a higher layer (e.g., RRC signalling) and defines a maximum quantity of ROs that may be frequency division multiplexed (e.g., up to 8). Furthermore, a third parameter (Z) may be used to order the msgA preamble resources in the time domain according to an increasing order of time resource indexes for ROs that are time division multiplexed within a PRACH slot, where 0≤Z≤max_number_TDM_RO−1, where max_number_TDM_RO is configured by a higher layer and defines a maximum quantity of ROs that may be frequency division multiplexed. In some aspects, a fourth parameter (W) may also be used to order the msgA preamble resources in the time domain according to an increasing order of PRACH slot indexes, where 0≤W≤max_number_RACH_slot−1, where max_number_RACH_slot is configured by a higher layer and defines a maximum quantity of RACH slots, each of which may include a quantity of time division multiplexed ROs up to max_number_TDM_RO.

Accordingly, the ordering procedures may generally indicate that the msgA preamble resources are to be sequentially ordered by the first parameter (X) in the code domain, followed by the second parameter (Y) in the frequency domain, followed by the third parameter (Z) in the time domain, followed by the fourth parameter (W) in the time domain. In some aspects, to generate the preamble resource index, the UE may select values for X, Y, Z, and W subject to the constraints described above. In some aspects, the UE may generate the preamble resource index using a function that applies different weights to each of the X, Y, Z, and W parameters. For example, in some aspects, the UE may generate the preamble resource index using the following function:

Preamble_Resource_Index=$X+64*Y+2^{(\lceil 6+\log_2(max\_number\_FDM\_RO)\rceil)}*Z+2^{(6+\lceil \log_2(max\_number\_FDM\_RO)\rceil+\lceil \log_2(max\_number\_TDM\_RO)\rceil)}*W$ Accordingly, the above function may provide a linear weighted combination based at least in part on the values that the UE selects for X, Y, Z, and W, and the preamble resource index may be different for different UEs as long as the selected values for X, Y, Z, and W differ in at least one dimension.

As further shown in FIG. 7A, and by reference number 730, the UE may configure one or more PUSCH resources for a msgA payload based at least in part on a preamble-to-PRU mapping and a PRU ordering. For example, as described above, the msgA payload may be transmitted after the msgA preamble, and the msgA payload may be mapped to a PRU. Accordingly, as described herein, the UE may follow one or more ordering procedures for a PUSCH resource index to configure the PUSCH resource(s) for the msgA payload based at least in part on multiple PRU configurations that may be supported on preconfigured time and frequency resources for the msgA payload. For example, different UEs may transmit the msgA payload using different quantities of resource blocks (RBs) (e.g., three RBs, six RBs, and/or the like), and the preamble-to-PRU mapping and a PRU ordering may be based at least in part on the different PRU configurations that are supported for the msgA payload.

In some aspects, in cases where msgA PUSCH resources are configured for multiple PRUs having the same type, a msgA PRU may be indexed according to a resource index of the msgA preamble selected by the UE when the preamble-to-PRU mapping is one-to-one or many-to-one (e.g., in cases where the PRU mapped to a preamble is deterministic, given a particular preamble). Additionally, or alternatively, in cases where the preamble-to-PRU mapping is one-to-many (e.g., multiple PRUs are mapped to the same preamble), the index of the msgA PRU may be based on the PRU group associated with the same preamble, which can be based on the resource index of the msgA preamble selected by the UE.

In some aspects, in cases where msgA PUSCH resources are configured for multiple PRUs having the different types, an ordering of the PRUs may depend on whether the different PRU types overlap in one or more time and/or frequency resources. For example, in cases where two or more PRU types overlap in one or more time and/or frequency resources, the overlapping PRUs may be ordered according to an ascending modulation coding scheme (MCS) (e.g., with a PRU associated with a lower code rate ordered before a PRU associated with a higher code rate), an ascending transport block size (TBS) (e.g., with a PRU associated with a smaller TBS ordered before a PRU associated with a larger TBS), and/or the like. Alternatively, in cases where different PRU types do not overlap in time and/or frequency resources, the non-overlapping PRUs may be ordered according to ascending frequency occasions (e.g., RBs or RB groups (RBGs)), time occasions (e.g., symbols or slots), and/or the like.

As shown in FIG. 7B, and by reference number 740, the UE may generate a scrambling identifier for the msgA payload based at least in part on a linear weighted combination of parameters. In some aspects, in a first technique, the linear weighted combination of parameters may be based at least in part on an RA-RNTI ($R_{ID}$), a preamble sequence index ($P_{ID}$), and an upper-layer configured data scrambling identifier ($n_{ID}$) (e.g., a cell identifier, which may be indicated in a higher-layer parameter, such as msgA-dataScramblingIdentity), with non-overlapping segments in bit expansion of the scrambling identifier. For example, in the first technique, the scrambling identifier may be determined as follows:

$$c_{init} = n_{ID}^{msgA-PUSCH} = 2^{C1} \times R_{ID} + 2^{C2} \times P_{ID} + 2^{C3} \times n_{ID}$$

where C1, C2, C3 are non-negative integers that may have different values to apply different weights to the $R_{ID}$, $R_{ID}$, and $n_{ID}$ parameters, $n_{ID}^{msgA-PUSCH}$ is the scrambling identifier, and $c_{init}$ is a value used to initialize a pseudorandom noise (PN) sequence generator, which may equal the scrambling identifier. For example, in some aspects, C1 may have a value of sixteen (16), C2 may have a value of ten (10), and C3 may have a value of zero (0) such that:

$$c_{init} = n_{ID}^{msgA-PUSCH} = 2^{16} \times R_{ID} + 2^{10} P_{ID} + n_{ID}$$

In another example, C1 may have a value of sixteen (16), C2 may have a value of zero (0), and C3 may have a value of six (6) such that:

$$c_{init} = n_{ID}^{msgA-PUSCH} + 2^{16} \times R_{ID} = P_{ID} + 2^6 \times n_{ID}$$

Alternatively, in a second technique, the linear weighted combination of parameters may be based at least in part on a truncated RA-RNTI ($R_{ID}^*$) in addition to the preamble sequence index ($P_{ID}$) and the upper-layer configured data scrambling identifier ($n_{ID}$). In this case, the scrambling identifier may be determined as follows:

$$c_{init} = n_{ID}^{msgA-PUSCH} = 2^{C1} \times R_{ID}^* + 2^{C2} \times P_{ID} + 2^{C3} \times n_{ID}$$

where $R_{ID}^*$ truncates $R_{ID}$ to only include a set of one or more most significant bits.

Accordingly, in FIG. 7B, reference number 750 illustrates an example scrambling identifier function based at least in part on the first and second techniques described above. For example, as shown, each of the parameters input to the function may have one or more most significant bits (MSBs) shifted by different amounts based on the corresponding non-negative integers, C1-C3, and after the MSBs have been shifted, corresponding values may be input to a multiplexer. As further shown in FIG. 7B, the multiplexer may output the scrambling identifier, $n_{ID}^{msgA-PUSCH}$, which is a sum of the three weighted terms in the formulas provided above. Accordingly, the scrambling identifier is used to initialize a PN sequence generator, which produces an output used to scramble one or more bits in the msgA payload.

As shown in FIG. 7C, and by reference number 760, the UE may generate a scrambling identifier for a DMRS associated with the msgA based at least in part on the scrambling identifier generated for the msgA payload. In particular, to reduce a DMRS collision probability for contention-based random access, a pool size for DMRS resources may be increased by utilizing the scrambling identifier generated for the msgA payload for a PUSCH waveform, which may use cyclic prefix OFDM (CP-OFDM), discrete Fourier transform spread OFDM (DFT-s-OFDM), and/or the like. In some aspects, the scrambling identifier used for a DMRS sequence may be a function of the RA-RNTI, the preamble sequence index, the cell identifier, and one or more time-dependent parameters associated with the PUSCH waveform used to transmit the msgA payload. For example, in cases where transform precoding is not enabled for the PUSCH waveform (e.g., the PUSCH waveform uses CP-OFDM), a PN sequence generator for the DMRS sequence can be initialized using a seed based at least in part on the scrambling identifier generated for the msgA payload, a slot or symbol index, an OFDM symbol index, and/or the like. Additionally, or alternatively, in cases where transform precoding is enabled for the PUSCH waveform (e.g., the PUSCH waveform uses DFT-s-OFDM), multiple groups of DMRS base sequences can be configured for one cell, and group indexes can be generated as a function of a time-dependent hopping pattern, the cell identifier, the RA-RNTI, the preamble sequence index, the scrambling identifier generated for the msgA payload, and/or the like.

As further shown in FIG. 7C, and by reference number 770, the UE may then generate msgA based at least in part on the msgA preamble resource index, the PUSCH resources configured for the msgA payload, the scrambling identifier for the msgA payload, the scrambling identifier for the DMRS, and/or the like. For example, as shown in FIG. 7C, the UE may select a PRACH preamble, which may be input to a radio resource mapping block. Furthermore, in some aspects, a payload and CRC for the msgA transmission may be input to a bit scrambling block, which may scramble one or more bits of the payload and/or the CRC according to the scrambling identifier (e.g., after applying channel coding and rate matching to the payload and CRC). The scrambled bits of the payload and/or the CRC may be input to a multiplexer (e.g., after applying linear modulation, transform precoding, an inverse fast Fourier transform (IFFT), and/or the like to the scrambled bits) along with uplink control information to be transmitted on the msgA PUSCH and a DMRS that is generated based at least in part on a preamble-to-PRU mapping. Furthermore, as described above, bits of the DMRS may be scrambled using a scrambling identifier that is based at least in part on the scrambling identifier used to scramble the bits of the payload and/or CRC. Accordingly, an output from the multiplexer may be provided to the radio resource mapping block, which generates the msgA based at least in part on the PRACH preamble and the output from the multiplexer.

As further shown in FIG. 7C, and by reference number 780, the UE may transmit the msgA on a shared or dedicated RO configured by the base station. For example, as described above, the UE may transmit the msgA preamble in a first symbol and subsequently transmit the msgA payload in a second symbol. In some aspects, as described elsewhere herein, the payload may carry a unique identifier associated with the UE, a MAC-CE (e.g., a power headroom report, a buffer status report, a beam failure report, a channel state report, and/or the like), user plane data, control plane data, and/or the like. As further shown in FIG. 7C, and by reference number 790, the base station may transmit, and the UE may receive, a msgB from the base station as a response to the msgA transmissions. For example, in some aspects, the msgB may be a downlink message that includes a PDCCH with a CRC masked by an RNTI and a PDSCH that carries at least a portion of the identifier associated with the UE. For example, the RNTI masking the CRC of the PDCCH may be a UE-specific identifier individually targeting the UE or a group identifier targeting a group of UEs sharing a particular RO. In the former case, the RNTI may be based at least in part on the scrambling identifier generated for the msgA payload (or PUSCH), the scrambling identifier generated for the DMRS associated with the msgA communication, the preamble resource index, the identifier associated with the UE, and/or the like. In the latter case, where the RNTI masking the CRC of the PDCCH is a group identifier targeting a group of UEs sharing a particular RO, the RNTI may be based at least in part on a resource index associated with the particular RO shared by the group of UEs, a common time and frequency resource index associated with one or more PRUs shared by the group of UEs, a common DMRS resource index shared by the group of UEs, a time and frequency resource index associated with the msgB, and/or the like.

As indicated above, FIGS. 7A-7C are provided as an example. Other examples may differ from what is described with regard to FIGS. 7A-7C.

Figure 8:
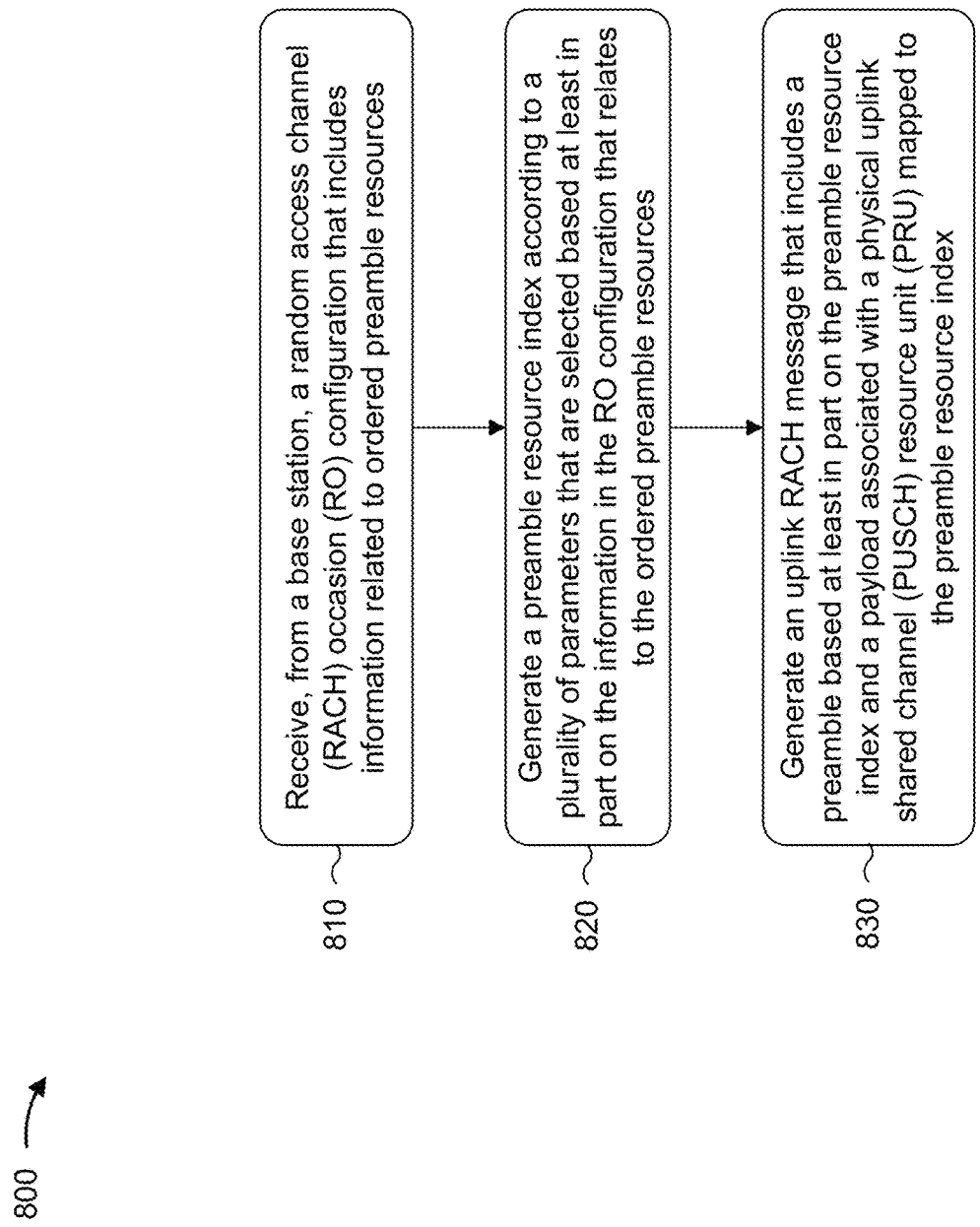
FIG. 8 is a diagram illustrating an example process performed, for example, by a UE, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120 and/or the like) performs operations that relate to ordering preamble and PUSCH resources and generating one or more scrambling identifiers for a two-step RACH procedure.

As shown in FIG. 8, in some aspects, process 800 may include receiving, from a base station, an RO configuration that includes information related to ordered preamble resources (block 810). For example, the UE may receive (e.g., using antenna 252, DEMOD 254, MIMO detector 256, receive processor 258, controller/processor 280, memory 282, and/or the like), from a base station, an RO configuration that includes information related to ordered preamble resources, as described above.

As further shown in FIG. 8, in some aspects, process 800 may include generating a preamble resource index according to a plurality of parameters that are selected based at least in part on the information in the RO configuration that relates to the ordered preamble resources (block 820). For example, the UE may generate (e.g., using controller/processor 280, memory 282, and/or the like) a preamble resource index according to a plurality of parameters that are selected based at least in part on the information in the RO configuration that relates to the ordered preamble resources, as described above.

As further shown in FIG. 8, in some aspects, process 800 may include generating an uplink RACH message that includes a preamble based at least in part on the preamble resource index and a payload associated with a PRU mapped to the preamble resource index (block 830). For example, the UE may generate (e.g., using controller/processor 280, memory 282, and/or the like) an uplink RACH message that includes a preamble based at least in part on the preamble resource index and a payload associated with a PRU mapped to the preamble resource index, as described above.

Process 800 may include additional aspects, such as any single aspect or any combination of aspects described below and/or in connection with one or more other processes described elsewhere herein.

In a first aspect, the information in the RO configuration relates to one or more ROs dedicated to a two-step RACH procedure or one or more ROs shared between the two-step RACH procedure and a four-step RACH procedure.

In a second aspect, alone or in combination with the first aspect, the information related to the ordered preamble resources includes one or more indexes that are repeated in different SSB-RO association periods.

In a third aspect, alone or in combination with one or more of the first and second aspects, the information related to the ordered preamble resources indicates that preamble resources are ordered sequentially based at least in part on preamble sequence indexes within an RO, frequency resource indexes for a set of ROs associated with an FDM configuration, time resource indexes for a set of ROs associated with a TDM configuration within a PRACH slot, and a set of PRACH slot indexes.

In a fourth aspect, alone or in combination with one or more of the first through third aspects, the plurality of parameters used to generate the preamble resource index include a first parameter selected from the preamble sequence indexes within the RO, a second parameter selected from the frequency resource indexes for the set of ROs associated with the FDM configuration, a third parameter selected from the time resource indexes for the set of ROs associated with the TDM configuration, and a fourth parameter selected from the set of PRACH slot indexes.

In a fifth aspect, alone or in combination with one or more of the first through fourth aspects, the preamble resource index is generated based at least in part on a function that applies different weights to respective parameters of the plurality of parameters.

In a sixth aspect, alone or in combination with one or more of the first through fifth aspects, the PRU configuration associated with the payload is one of multiple PRU configurations associated with time and frequency resources that are configured for the uplink RACH message.

In a seventh aspect, alone or in combination with one or more of the first through sixth aspects, the multiple PRU configurations are indexed based at least in part on indexes associated with the ordered preamble resources.

In an eighth aspect, alone or in combination with one or more of the first through seventh aspects, generating the uplink RACH message includes ordering the multiple PRU configurations according to one or more criteria, and selecting the PRU configuration associated with the payload from the multiple PRU configurations based at least in part on the ordering.

In a ninth aspect, alone or in combination with one or more of the first through eighth aspects, the one or more criteria used to order the multiple PRU configurations include one or more of an ascending modulation coding scheme or an ascending transport block size, based at least in part on the multiple PRU configurations overlapping in one or more of the time or frequency resources.

In a tenth aspect, alone or in combination with one or more of the first through ninth aspects, the one or more criteria used to order the multiple PRU configurations include one or more of ascending frequency occasions or ascending time occasions, based at least in part on the multiple PRU configurations not overlapping in the time or frequency resources.

In an eleventh aspect, alone or in combination with one or more of the first through tenth aspects, generating the uplink RACH message includes generating a scrambling identifier for the payload according to a set of parameters that is based at least in part on an index associated with the preamble, and scrambling the payload using the scrambling identifier.

In a twelfth aspect, alone or in combination with one or more of the first through eleventh aspects, the set of parameters used to generate the scrambling identifier is further based at least in part on an RA-RNTI and a data scrambling identifier configured by the base station.

In a thirteenth aspect, alone or in combination with one or more of the first through twelfth aspects, the scrambling identifier is generated based at least in part on a function that applies different weights to respective parameters of the set of parameters.

In a fourteenth aspect, alone or in combination with one or more of the first through thirteenth aspects, generating the uplink RACH message further includes generating a DMRS sequence associated with the uplink RACH message, where the DMRS sequence is scrambled based at least in part on the scrambling identifier for the payload and one or more time-dependent parameters associated with a PUSCH waveform used to transmit the payload.

In a fifteenth aspect, alone or in combination with one or more of the first through fourteenth aspects, the uplink RACH message is associated with a two-step RACH procedure.

In a sixteenth aspect, alone or in combination with one or more of the first through fifteenth aspects, process 800 further includes transmitting, to the base station, the preamble associated with the uplink RACH message and the payload associated with the uplink RACH message, where the preamble and the payload are transmitted in separate symbols based at least in part on a time division multiplexing configuration, and where the payload carries at least one of a unique identifier associated with the UE, a MAC-CE, or user plane or control plane data.

In a seventeenth aspect, alone or in combination with one or more of the first through sixteenth aspects, process 800 further includes receiving, from the base station, a downlink response message to the uplink RACH message, where the downlink response message includes a PDCCH and a PDSCH, and where the PDCCH includes a CRC masked by an RNTI and the PDSCH carries at least a portion of the identifier associated with the UE.

In an eighteenth aspect, alone or in combination with one or more of the first through seventeenth aspects, the RNTI masking the CRC of the PDCCH is a UE-specific identifier individually targeting the UE, and the RNTI is based at least in part on one or more of a data scrambling identifier for a PUSCH, a DMRS scrambling identifier associated with the uplink RACH message, the preamble resource index, or the identifier associated with the UE that is carried in the payload of the uplink RACH message.

In a nineteenth aspect, alone or in combination with one or more of the first through eighteenth aspects, the RNTI masking the CRC of the PDCCH is a group identifier targeting a group of UEs sharing a particular RO, and the RNTI is based at least in part on one or more of a resource index associated with the particular RO shared by the group of UEs, a common time and frequency resource index associated with one or more PRUs shared by the group of UEs, a common DMRS resource index shared by the group of UEs, or a time and frequency resource index associated with the downlink response message.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a random access channel (RACH) occasion (RO) configuration that includes information related to ordered preamble resources,
      wherein a preamble resource index is generated according to a plurality of parameters that are selected based at least in part on the information in the RO configuration that relates to the ordered preamble resources, and
      wherein the preamble resource index is generated based at least in part on a function that applies different weights to respective parameters of the plurality of parameters; and
   transmitting an uplink RACH message that includes a preamble based at least in part on the preamble resource index and includes a payload associated with a physical uplink shared channel (PUSCH) resource unit (PRU) mapped to the preamble resource index.

2. The method of claim 1, wherein the information in the RO configuration relates to one or more ROs dedicated to a two-step RACH procedure.

3. The method of claim 1, wherein the information related to the ordered preamble resources indicates that the ordered preamble resources are ordered sequentially based at least in part on preamble sequence indexes within an RO, frequency resource indexes for a first set of ROs associated with a frequency division multiplexing (FDM) configuration, time resource indexes for a second set of ROs associated with a time division multiplexing (TDM) configuration within a physical RACH (PRACH) slot, and a set of PRACH slot indexes.

4. The method of claim 3, wherein the plurality of parameters used to generate the preamble resource index include a first parameter selected from the preamble sequence indexes within the RO, a second parameter selected from the frequency resource indexes for the first set of ROs associated with the FDM configuration, a third parameter selected from the time resource indexes for the second set of ROs associated with the TDM configuration, and a fourth parameter selected from the set of PRACH slot indexes.

5. The method of claim 1, wherein a PRU configuration associated with the payload is one of multiple PRU configurations associated with time and frequency resources that are configured for the uplink RACH message.

6. The method of claim 5, wherein the multiple PRU configurations are indexed based at least in part on indexes associated with the ordered preamble resources.

7. The method of claim 5, wherein the multiple PRU configurations are ordered according to one or more criteria, the method further comprising:
   selecting the PRU configuration associated with the payload from the multiple PRU configurations based at least in part on the ordering.

8. The method of claim 1, wherein the payload is scrambled using a scrambling identifier, and wherein the scrambling identifier is generated according to a set of parameters that is based at least in part on an index associated with the preamble.

9. The method of claim 8, wherein the set of parameters used to generate the scrambling identifier is further based at least in part on a random access radio network temporary identifier and a data scrambling identifier.

10. A user equipment (UE) for wireless communication, comprising:
   a memory; and
   one or more processors coupled to the memory, the one or more processors configured to:
      receive a random access channel (RACH) occasion (RO) configuration that includes information related to ordered preamble resources,
         wherein a preamble resource index is generated according to a plurality of parameters that are selected based at least in part on the information in the RO configuration that relates to the ordered preamble resources, and
         wherein the preamble resource index is generated based at least in part on a function that applies different weights to respective parameters of the plurality of parameters; and
      transmit an uplink RACH message that includes a preamble based at least in part on the preamble resource index and includes a payload associated with a physical uplink shared channel (PUSCH) resource unit (PRU) mapped to the preamble resource index.

11. The UE of claim 10, wherein the information in the RO configuration relates to one or more ROs dedicated to a two-step RACH procedure.

12. The UE of claim 10, wherein the information related to the ordered preamble resources indicates that the ordered preamble resources are ordered sequentially based at least in part on preamble sequence indexes within an RO, frequency resource indexes for a first set of ROs associated with a frequency division multiplexing (FDM) configuration, time resource indexes for a second set of ROs associated with a time division multiplexing (TDM) configuration within a physical RACH (PRACH) slot, and a set of PRACH slot indexes.

13. The UE of claim 12, wherein the plurality of parameters used to generate the preamble resource index include a first parameter selected from the preamble sequence indexes within the RO, a second parameter selected from the frequency resource indexes for the first set of ROs associated with the FDM configuration, a third parameter selected from the time resource indexes for the second set of ROs associated with the TDM configuration, and a fourth parameter selected from the set of PRACH slot indexes.

14. The UE of claim 10, wherein a PRU configuration associated with the payload is one of multiple PRU configurations associated with time and frequency resources that are configured for the uplink RACH message.

15. The UE of claim 14, wherein the multiple PRU configurations are indexed based at least in part on indexes associated with the ordered preamble resources.

16. The UE of claim 14, wherein the multiple PRU configurations are ordered according to one or more criteria, wherein the one or more processors are further configured to:
   select the PRU configuration associated with the payload from the multiple PRU configurations based at least in part on the ordering.

17. The UE of claim 10, wherein the payload is scrambled using a scrambling identifier, and wherein the scrambling identifier is generated according to a set of parameters that is based at least in part on an index associated with the preamble.

18. The UE of claim 17, wherein the set of parameters used to generate the scrambling identifier is further based at least in part on a random access radio network temporary identifier and a data scrambling identifier.

19. A non-transitory computer-readable medium storing one or more instructions for wireless communication, the one or more instructions comprising:
one or more instructions that, when executed by one or more processors of a user equipment, cause the one or more processors to:
receive a random access channel (RACH) occasion (RO) configuration that includes information related to ordered preamble resources,
wherein a preamble resource index is generated according to a plurality of parameters that are selected based at least in part on the information in the RO configuration that relates to the ordered preamble resources, and
wherein the preamble resource index is generated based at least in part on a function that applies different weights to respective parameters of the plurality of parameters; and
transmit an uplink RACH message that includes a preamble based at least in part on the preamble resource index and includes a payload associated with a physical uplink shared channel (PUSCH) resource unit (PRU) mapped to the preamble resource index.

20. The non-transitory computer-readable medium of claim 19, wherein the information in the RO configuration relates to one or more ROs dedicated to a two-step RACH procedure.

21. The non-transitory computer-readable medium of claim 19, wherein the information related to the ordered preamble resources indicates that the ordered preamble resources are ordered sequentially based at least in part on preamble sequence indexes within an RO, frequency resource indexes for a first set of ROs associated with a frequency division multiplexing (FDM) configuration, time resource indexes for a second set of ROs associated with a time division multiplexing (TDM) configuration within a physical RACH (PRACH) slot, and a set of PRACH slot indexes.

22. The non-transitory computer-readable medium of claim 21, wherein the plurality of parameters used to generate the preamble resource index include a first parameter selected from the preamble sequence indexes within the RO, a second parameter selected from the frequency resource indexes for the first set of ROs associated with the FDM configuration, a third parameter selected from the time resource indexes for the second set of ROs associated with the TDM configuration, and a fourth parameter selected from the set of PRACH slot indexes.

23. The non-transitory computer-readable medium of claim 19, wherein a PRU configuration associated with the payload is one of multiple PRU configurations associated with time and frequency resources that are configured for the uplink RACH message.

24. The non-transitory computer-readable medium of claim 23, wherein the multiple PRU configurations are indexed based at least in part on indexes associated with the ordered preamble resources.

25. The non-transitory computer-readable medium of claim 24, wherein the multiple PRU configurations are ordered according to one or more criteria, wherein the one or more instructions, when executed by one or more processors of the UE, cause the one or more processors further to:
select the PRU configuration associated with the payload from the multiple PRU configurations based at least in part on the ordering.

26. The non-transitory computer-readable medium of claim 19, wherein the payload is scrambled using a scrambling identifier, and wherein the scrambling identifier is generated according to a set of parameters that is based at least in part on an index associated with the preamble.

27. The non-transitory computer-readable medium of claim 26, wherein the set of parameters used to generate the scrambling identifier is further based at least in part on a random access radio network temporary identifier and a data scrambling identifier.

28. An apparatus for wireless communication, comprising:
means for receiving a random access channel (RACH) occasion (RO) configuration that includes information related to ordered preamble resources,
wherein a preamble resource index is generated according to a plurality of parameters that are selected based at least in part on the information in the RO configuration that relates to the ordered preamble resources, and
wherein the preamble resource index is generated based at least in part on a function that applies different weights to respective parameters of the plurality of parameters; and
means for transmitting an uplink RACH message that includes a preamble based at least in part on the preamble resource index and includes a payload associated with a physical uplink shared channel (PUSCH) resource unit (PRU) mapped to the preamble resource index.

29. The apparatus of claim 28, wherein the information in the RO configuration relates to one or more ROs dedicated to a two-step RACH procedure.

30. The apparatus of claim 29, wherein the information related to the ordered preamble resources indicates that the ordered preamble resources are ordered sequentially based at least in part on preamble sequence indexes within an RO, frequency resource indexes for a first set of ROs associated with a frequency division multiplexing (FDM) configuration, time resource indexes for a second set of ROs associated with a time division multiplexing (TDM) configuration within a physical RACH (PRACH) slot, and a set of PRACH slot indexes.

* * * * *